(12) United States Patent
Zhang et al.

(10) Patent No.: US 6,185,329 B1
(45) Date of Patent: Feb. 6, 2001

(54) AUTOMATIC CAPTION TEXT DETECTION AND PROCESSING FOR DIGITAL IMAGES

(75) Inventors: Hong Jiang Zhang, Mountain View, CA (US); Yu Zhong, Pittsburgh, PA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/170,995

(22) Filed: Oct. 13, 1998

(51) Int. Cl.$^7$ .............................. G06K 9/34; G06K 9/36; G06K 9/46; H04N 1/40
(52) U.S. Cl. .................. 382/176; 382/239; 382/282; 358/462; 358/464
(58) Field of Search ..................... 382/176, 233, 382/236, 172, 276, 282, 290, 291, 292, 173, 239; 358/462, 464; 348/403, 404, 468

(56) References Cited

U.S. PATENT DOCUMENTS

| | | | |
|---|---|---|---|
| 5,535,013 | * 7/1996 | Murata | 358/432 |
| 5,703,655 | * 12/1997 | Corey et al. | 348/468 |
| 6,009,196 | * 12/1999 | Mahoney | 382/176 |
| 6,044,178 | * 3/2000 | Lin | 382/260 |
| 6,052,484 | * 4/2000 | Kobayashi | 382/195 |
| 6,055,336 | * 4/2000 | Niki | 382/237 |

OTHER PUBLICATIONS

Gargi et al., "A System for Automatic Text detection in Video", pp.29–32,Document Analysis and recognition, 1999. ICDAR'99, Proceedings of the Fifth International Conference.*

Zhong et al., "Automatic caption localization in compressed video", pp. 96–100, 1999.*

Lebourgeois et al., Towards a description for video Indexation, pp. 912–915, 1999.*

Gargi et al., "Indexing Text Events in Digital Video Databases", pp. 916918, 1999.*

Chaddha et al., "Text segmentation Using Linear Transforms", pp. 1447–1451, 1996.*

Chaddha, "Segmentation–Assisted Compresion of Multimedia Documents", pp. 1452–1456, 1996.*

Chaddha et al., "Text Segmentation in Mixed–Mode Images", pp. 1356–1361, 1995.*

* cited by examiner

Primary Examiner—Leo H. Boudreau
Assistant Examiner—Dmitry A. Novik

(57) ABSTRACT

A texture-based text localization system proceeds directly in the compressed domain for DCT compressed JPEG images or MPEG videos. The DCT coefficient values in JPEG images and MPEG videos, which capture the directionality and periodicity of local image blocks, are used as texture feature measures to classify text areas. Each unit block in the compressed images is classified as either text or nontext. In addition, post-processing in both the compressed domain and the reconstructed candidate text areas can be used to refine the results. For video frames that contain text, the displacement of text between two consecutive frames is estimated which gives the velocity of the moving text. This temporal displacement information is also used to further refine the localization results. The text is then processed to provide content or speech output.

20 Claims, 2 Drawing Sheets

AUTOMATIC CAPTION TEXT DETECTION AND PROCESSING FOR DIGITAL IMAGES

TECHNICAL FIELD

The present invention relates generally to the text recognition in images and more particularly to automatic extraction of text from digital images.

BACKGROUND ART

In the past, it has been very difficult to identify and read text which is placed in a still or video image. Digital "photographs" and videos have been playing an increasing role in education, entertainment, and multimedia applications. With hundreds of thousands of videos, there have been urgent demands on efficiently storing, browsing, and retrieving video data. For example, the credits in a movie, subtitles in foreign movies, or for the hearing impaired, dates in home videos, or even logos and trademarks are important because it would be possible to determine the contents of still and moving images (herein after referred to as "pictures").

Various video understanding techniques using one or a combination of image contents, audio, and textual information presented in the videos have been proposed to index, parse, and abstract the massive amount of video data. Among these, the texts that are presented in the video images play an important role in understanding the raw video sequences. For example, the captions in news broadcasts usually annotate where, when, and who of the ongoing events. In home videos, the captions/credits depict the title, the producers/actors, or sometimes, the context of the story. In advertisements, the text presented tells which product it is. Furthermore, specific texts/symbols that are presented at specific places in the video images can be used to identify the TV station/program of the video. Essentially, the texts/captions in videos provide highly condensed information of the contents of the video. They are very useful for understanding and abstracting the videos and facilitate browsing, skimming, searching, and retrieval of digital video databases.

While extracting information from images and videos are easy to do for humans, it is very difficult for computers to do. First there is the optical character recognition (OCR) problems which still prevent 100% recognition of black characters even on a white background. The problems are compounded when the text is superimposed on complex backgrounds with natural images or complex graphics.

Many attempts to solve these problems have been performed on uncompressed still images or decompressed video sequences. These methods in general utilize the characteristics of text including: 1) restricted character size, 2) text lines always appearing in clusters of vertical characters which are aligned horizontally, and 3) text usually having a high contrast with the background.

Almost all the previously published methods on locating text can be categorized as either component-based or texture-based.

For component-based text extraction methods, text is detected by analyzing the geometrical arrangement of edges or segmented color/grayscale components that belong to characters. For example, in one system text is identified as horizontal rectangular structures of clustered sharp edges. Another system extracts text as those connected components of monotonous color which follow certain size constraints and the horizontal alignment constraints. In a similar manner, a further system identifies text as connected components which are of the same color, which fall in some size range, and which have corresponding matching components in consecutive video frames. Since the component-based approach assumes that the characters come out as connected color/grayscale components, these systems usually require images of relatively high resolution in order to segment the characters from their background.

For texture-based extraction methods, text is detected by using the characteristic that text areas possess a special texture. Text usually consists of character components which contrast with the background, which at the same time exhibit a periodic horizontal intensity variation due to the horizontal alignment of characters, and which form text lines with about the same spacings between them. As a result, using texture features, text is expected to be segmented. One system uses the distinguishing texture presented in text to determine and separate text, graph, and halftone image areas in scanned grayscale document images. Another further utilizes the texture characteristics of text lines to extract texts from grayscale images with complex backgrounds. They defined for each pixel the text energy as the horizontal spatial variation in a 1×n neighborhood window, and located texts as rectangular areas of high text energy. This method was applied to a variety of still intensity images with an acceptable performance.

Almost all the previously published methods are performed on uncompressed still images or image sequences even when they are designed for digital videos, for example, JPEG (Joint Photographic Experts Group, a world-wide standards organization) images. However, digital videos and some image formats are usually compressed to reduce the size of the data for efficient storage and transmission. For example, MPEG (Motion Picture Experts Group, a world-wide standards organization) videos are compressed exploiting the spatial redundancy within a video frame and the temporal redundancy between consecutive frames. The spatial information of an image/frame is obtained by applying a decompressing algorithm to the compressed version. As a result, it is difficult to apply the image processing procedures of the previously mentioned systems directly in the compressed domain. The digital video sequence is decompressed before one can apply such text detection/extraction algorithms. None of the previous systems attempts to utilize features in the compressed domain to locate text directly.

In the multimedia arena, as digital image and video data accumulates and compression techniques become more and more sophisticate, there is an emerging trend and need of feature extraction and manipulation directly from compressed domain image/videos. By manipulating features directly from the compressed domains, it would be possible save the resources (computation time and storage) of decompressing the complete video sequence.

One system has been proposed to extract embedded captions in a partially uncompressed domain for MPEG videos, where the video frames are reconstructed using either the DC components or the DC components plus two AC components at a reduced resolution. Then areas of large between-frame differences are detected as the appearance and disappearance of the captions. Unfortunately, this method only detects abrupt captions and does not handle captions that gradually enter or disappear from the frames. It is further vulnerable to moving objects in the image. As the image resolution is reduced by a factor of 64 (DC sequence only) or 16 (DC+2AC), a considerable amount of information is lost and the accuracy of the method is deteriorated.

Thus, there has been a great deal of unsuccessful effort expended trying to find a system which can identify text any place in a picture. Further, with moving pictures, it is necessary that the system be able to recognize text in real time.

In addition, since there are currently no systems by which an OCR system can distinguish between text and a background image, such a system is highly desirable.

Further, there are no systems which can read text where the images are compressed such as MPEG-1 or MPEG-2 or MPEG-4. Decompressing compressed images takes up time and storage space and is therefore undesirable.

Thus, a system which can actually determine which areas are actually likely to have text and then decompresses only those areas would be extremely valuable.

DISCLOSURE OF THE INVENTION

The present invention provides a texture-based text localization method which proceeds directly in the compressed domain for DCT compressed JPEG images or MPEG videos. The DCT coefficient values in JPEG images and MPEG videos, which capture the directionality and periodicity of local image blocks, are used as texture feature measures to classify text areas. Each unit block in the compressed images is classified as either text or nontext. In addition, post-processing in both the compressed domain and the reconstructed candidate text areas can be used to refine the results. For video frames that contain text, the displacement of text between two consecutive frames is estimated which gives the velocity of the moving text. This temporal displacement information is also used to further refine the localization results.

The present invention further provides a real time text recognition system where the text can be read by an OCR system and input into systems providing other features such as indexing or speech recognition.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
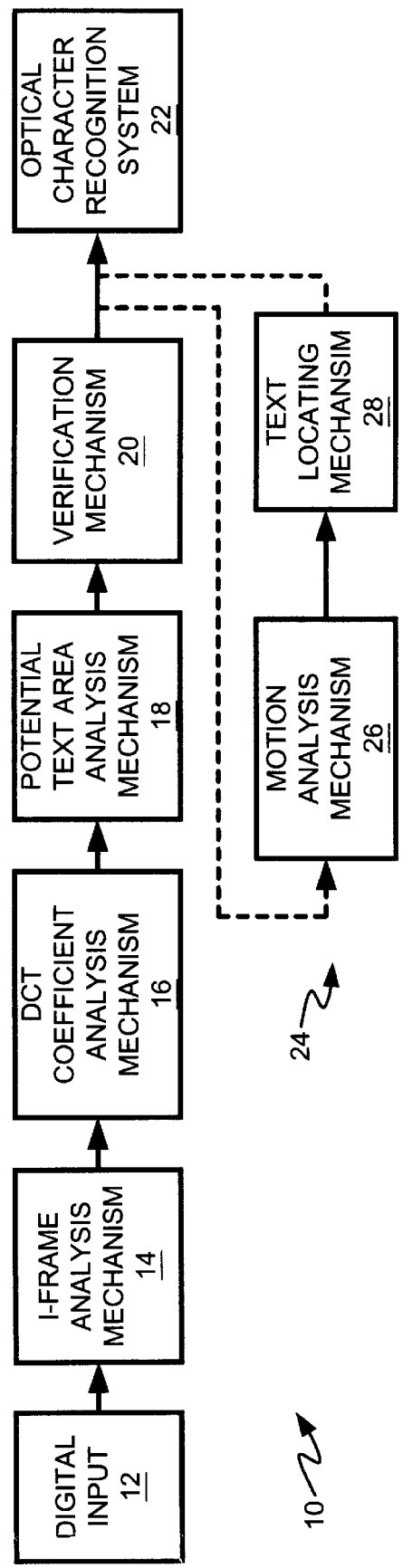
FIG. 1 is a schematic of the system of the present invention.

Referring now to FIG. 1, therein is shown the automatic caption text detection system 10. The detection system 10 has a digital input 12 connected to an Intra-frame (I-frame) analysis mechanism 14. The I-frame analysis mechanism 14 is connected to a Discrete Cosine Transform (DCT) coefficient analysis mechanism 16, which in turn is connected to a potential text area analysis mechanism 18. The potential text area analysis mechanism 18 is connected to a verification mechanism 20. The output of the verification mechanism 20 is connected to an optical character recognition (OCR) system 22.

Also shown in FIG. 1 is an optional video text detection system 24 which has a motion analysis mechanism 26 connected to receive inputs from the verification mechanism 20. The motion analysis mechanism 26 is connected to a text locating mechanism 28 which outputs to the OCR system 22.

Figure 2:
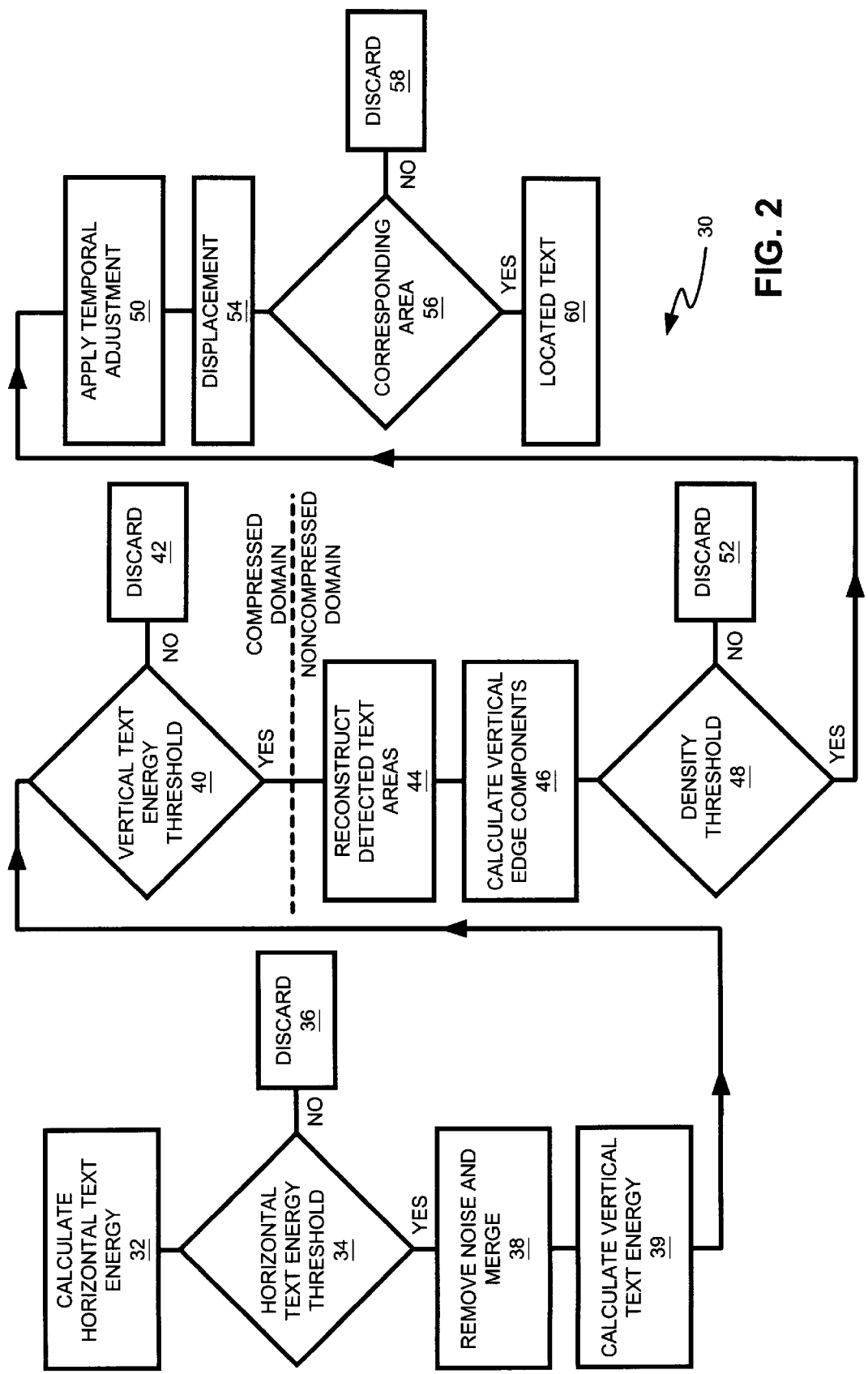
FIG. 2 is a flow chart of the method of the present invention for locating text in a picture.

Referring now to FIG. 2, therein is shown a flowchart of the method 30 used in the detection system 10. The method 30 starts with the calculation of the horizontal text energy at block 32. Text energy is a measure of how quickly a picture changes from pixel (picture element) to pixel. It is generally high for sharp edged objects such as characters and low for slowly changing natural objects.

After the calculation, there is a horizontal text energy threshold decision block 34 where areas of low horizontal energy are discarded to block 36, and areas of high horizontal energy, which probably contain text, are passed through to the remove noise and merge block 38. At the remove noise and merge block 38, noisy image areas are removed and areas which may contain the same text are merged.

From the remove noise and merge block 38, the possible text areas move to the calculate vertical energy block 39 and then to the vertical text energy threshold decision block 40. If an area contains a row with a low vertical energy, it is discarded to the block 42, and if it has a row with high vertical energy, it is kept for further processing in the reconstruct detected text areas block 44 where the potential text area is reconstructed in a non-compressed domain. This is generally a very small area compared to the area of an entire picture.

The reconstructed text areas are then passed to the calculate vertical edge components block 46 for further verification. The vertical edge components basically correspond to the strokes of the characters so the denser the edges, the greater the likelihood that the area is a text area.

After calculation of the vertical edge components in block 46, the area is passed to the density threshold decision block 48 to determine if the density of the horizontally aligned edges is more than the threshold value. If it is, the area passes to the OCR system 22 for still pictures or to the applied temporal adjustment block 50 for a sequence of pictures or for video sequences. If not, the area passes to the discard block 52.

After applying the temporal adjustments in block 50, the displacement of text areas in two consecutive frames is estimated in displacement block 54. The area is then passed to the corresponding area decision block 56 to determine if there is a corresponding area in successive pictures, or frames. If not, the area passes to discard block 58 and if it is, the area is designated as located text in located text block 60.

Figure 3:
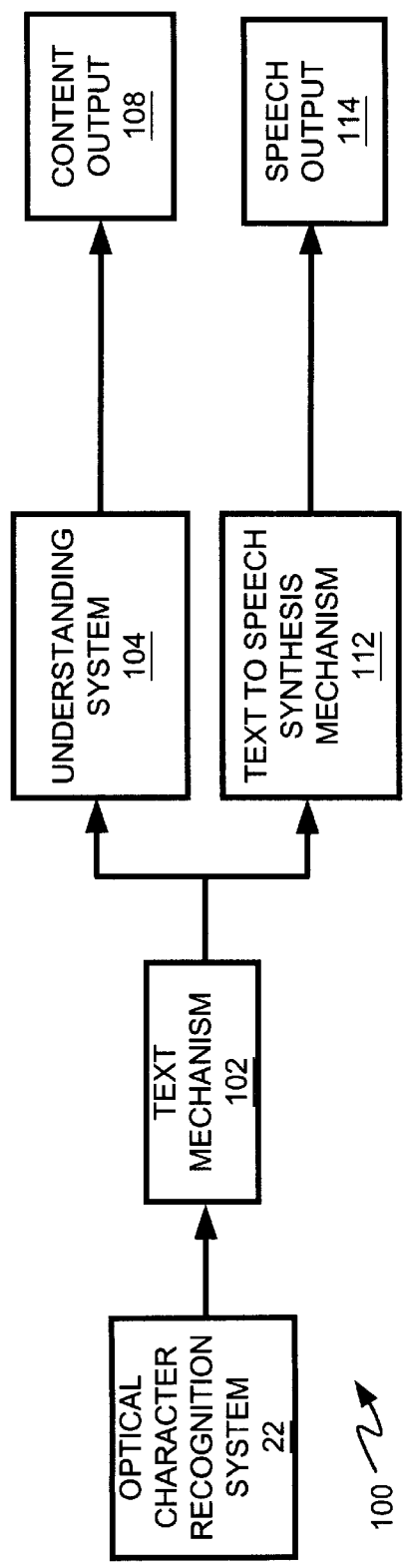
FIG. 3 is a schematic of the output processing system of the present invention.

Referring now to FIG. 3, therein is shown the automatic caption text processing system 100 which includes the OCR system 22 from the detection system 10 as the initial input. From the OCR system 22, there are at least two alternate paths. The first is through the conversion mechanism for bringing the characters back into text form in the text mechanism 102. The output of the text mechanism 102 is provided to one of a number of different understanding systems 104, which provides an output to the content output 108.

Another path from the OCR system 22 and the text mechanism 102 to a text-to-speech synthesis mechanism 112. The speech synthesis output is then provided to a speech output 114.

In operation, the digital input 12 receives a discrete cosine transform (DCT) compressed digital image from a still or video source. The input from the digital input 12 is inputted into the I-frame analysis mechanism 14. It should be understood that the I-frame, or Intra-frame, refers to a JPEG or an MPEG single, compressed image.

For a JPEG image, the I-frame analysis mechanism 14 examines an image, which is a self-contained image. The image is coded by the DCT compression algorithm as previously indicated. The image analysis is done by examining the DCT coefficient looking for high frequency in changes. If one of the areas, which are blocks in the DCT compressed images, a check is made for high frequency transitions and if there is no such transitions, it is unlikely that the block contains text.

MPEG videos utilize the spatial redundancy in one frame and the temporal redundancy between frames to achieve low-bit rate compression, e.g., IBBBPBBBPBBBI. It consists of a sequence of I-frames with a number of B- and P-frames between them. The I-frames are compressed using forward DCT of image blocks. B- and P-frames are compressed primarily utilizing the temporal redundancy. The P-frames are predicted from the I-frame before it or another P-frame before it. B-frames are interpolated using the two I-frames, an I-frame and B-frame, or two P-frames before and after it.

The I-frame analysis mechanism 14 then discards any areas in which there are no high-frequency transitions since it would be unlikely for those areas to contain text. Those areas which are likely to contain text are then passed to the DCT coefficient analysis mechanism 16. It should be understood that DCT-based image compression techniques encode a two-dimensional image by the block DCT coefficients. To compress an image, the DCT coefficients of each N×N image block (macroblock) are computed and quantized. These compression techniques take advantage of the fact that most of the high frequency components of the transformed image are close to zero. The low-order coefficients are quantized to save the bits, and then further compressed using either the Huffman coding or the arithmetic coding methods. DCT-based compression is widely used and examples include JPEG images and I-frames of MPEG videos, where the value of N is set to 8.

$$c_{uv} = \frac{1}{N} K_u K_v \sum_{x=0}^{N-1} \sum_{y=0}^{N-1} I_{xy} \cos\frac{\pi u(2x+1)}{2N} \cos\pi\frac{u(2y+1)}{2N} \quad (1)$$

where u and v denote the horizontal and vertical frequencies (u, v=01, ..., N-1), $$K_u = K_v = \frac{1}{\sqrt{2}} \text{ for } u = v = 0, \text{ and } K_u = K_v = 1, \text{ otherwise.}$$

The DC component ($c_{oo}$) of the transformed coefficients represents the average of the spatial domain signals $I_{xy}$ in the macroblock, and the AC components ($c_{uv}$, u≠0 or v≠0) capture the frequency (characterized by u and v) and directionality (by tuning the u and v values) properties of the N×N image block.

The texture-based method of the present invention utilizes the fact that text represents a special kind of texture which makes it different from others. An image area is textured if it contains some repeating gray level patterns. Therefore, text areas possess a unique texture because they typically follow a specific arrangement rule: each area consists of text lines of the same orientation with approximately the same spacings in-between and each text line consists of characters of approximately the same size and which are placed next to each other. These distinguishing text characteristics of directionality and periodicity can be captured by digital filters that are tuned to a certain direction and frequency. It should be noted that although the spatial component information is difficult to retrieve from the compressed domain, texture features are not.

Thus, the DCT coefficients in the compressed domain are used to classify text areas because:

1) the DCT coefficient values, which are computed based on the 8×8 spatial input, give the local texture measures;

2) the DCT coefficient values, which are the amplitude of harmonic waves, denote the relative amounts of the 2D spatial frequencies contained in the 8×8 block. Therefore, they can be used as measures of spatial periodicity and directionality, when frequencies in the x and y dimension are properly tuned;

3) the quantized DCT coefficients can be readily extracted from a JPEG compressed image or an MPEG compressed video stream. Although they are quantized, the rank information is preserved and can be used to compute texture features using the quantized coefficients without any decoding procedure.

The method is based on the heuristics that a text line consists of characters which 1) contrast with the background;

2) are closely placed next to each other; and 3) are aligned horizontally.

Based on the first two heuristics, a text line should respond high to the horizontal harmonics because of the rapid changes in intensity due to different characters in a text line. At the same time, a text area should also have high response for vertical harmonics because of the changes in intensity due to different text lines. In particular, the AC coefficients of the horizontal harmonics ($c_{0v}$>0) are used to capture the horizontal intensity variations caused by characters and the amplitude of the vertical harmonics ($c_{u0}$>0) to capture the vertical intensity variations caused by text lines.

To obtain candidate text areas using only the information in the compressed domain, the DCT coefficient analysis mechanism 16 performs the following operations (The units of operation units are 8×8 macroblocks in the I-frames):

1) Detecting blocks of high vertical spatial variation by computing for each 8×8 DCT block (i,j) the vertical text energy $E_{ver}(i,j)$ by summing up the absolute amplitudes of the horizontal harmonics $c_{0v}(I,j)$ of the block:

$$E_{ver}(i,j) = \sum_{v_1 \leq v \leq v_2} c_{0v}(i,j) \quad (2)$$

where $v_1$, and $v_2$, are parameters of the algorithm. They should be selected based on the size of the characters to be located. These energy values are then thresholded in decision block 34 to obtain the blocks of high horizontal energy. A block is a text candidate if its text energy is above the threshold. This simple thresholding procedure does get most of the text blocks. But at the same time, it may also obtain the nontext image blocks which also contain high vertical intensity variations. Further more, depending on the spaces between characters or words, the detected text candidate blocks may be detached or disconnected due to wide spacing, low contrast, or large fonts. At this stage, the results using the simple thresholding tend to be noisy and need further refinement and verification.

2) Refining text candidate blocks using spatial constraints: The noise from the previous stage is removed by applying morphological operations to the thresholded image (in the unit of an 8×8 block, so the image size is ⅛th of the original image in each dimension). Although nontext blocks sometimes respond high to horizontal harmonics, their occurrences are generally random, and they seldom merge collectively into rows as text blocks do. A closing followed by an opening operation is applied to the thresholded image. A structural element of size 1×3 is chosen because text blocks tend to merge into horizontal lines. This processing step basically removes most of the isolated noisy blocks and merges the nearby detached texted blocks into coherent areas.

3) Refining text candidate blocks using between-line variations in the potential text area analysis mechanism 18:

The candidate text areas are further screened using the third heuristic about text: a text line that contrasts with the background should possess large vertical variation at its top and bottom borders. As a result, it contributes to local vertical harmonics. For a horizontal text line, there corresponds a row of blocks of high vertical spectrum energy. The horizontal text energy $E_{hor}(i,j)$ for each block (i,j) is calculated by summing up the absolute DCT coefficient values $c_{u0}(i,j)$ $$E_{hor}(i,j) = \sum_{u_1 \le u \le u_2} c_{u0}(i,j) \quad (3)$$

where again, $u_1$ and $u_2$ are the parameters. The average vertical text energy $\epsilon_{hor}(i)$ for row i in a detected candidate text area, or region R, is computed as follows:

$$\varepsilon_{or}(i) = \sum_{j:(i,j) \in R} E_{hor}(i,j) / \sum_{j:(i,j) \in R} \quad (4)$$

If a candidate area does not contain a row with high average vertical text energy, it is regarded as nontext and discarded.

The localization results using compressed data generally contain text with certain contrast, within some character size range. But they may also contain false positives which are nontext. To further eliminate the false positives, the detected text blocks are reconstructed to the noncompressed domain using reverse DCT in reconstruct detected text areas block 44, and further verify the text areas using the spatial data in the verification mechanism 20. Note that only a very small portion of the image needs to be reconstructed. Analysis is now at pixel level instead of block level. The verification process is akin to component-based text localization algorithms. However, to deal with the poor resolution which is common in videos, the vertical edge components are used instead of the color or intensity segments as used in other systems. The refinement in the uncompressed domain proceeds as follows:

1) Compute vertical edge segments in the candidate text areas.

Since these edge segments basically correspond to the strokes of the characters, we use the density of the vertical edges to distinguish text areas from nontext areas. The edge pixels are detected as local horizontal intensity extremas. A pixel (i,j) is a local horizontal intensity extrema if it has a grayscale value which is great than or less than both ones on its left and right side, i.e., either Intensity(i,j−1)<Intensity(i,j) and Intensity(i,j)>Intensity(i,j+1) or Iniensity(i,j−1)>Intensity(i,j) and Intensity(i,j)<Intensity(i,j+1). These extrema can be calculated by one scan of the candidate areas.

2) Filter out those vertical edge segments without horizontally aligned counterparts.

As characters are aligned to each other to form horizontal text lines, the edge segments which have horizontally aligned counterparts are used to assess the candidate areas. A vertical edge segment is considered as part of a character if its size falls into a certain range (threshold on character height), and if it has at least n other edge segments with about the same horizontal coordinates of the centroids (threshold on horizontal alignment). Otherwise, this edge segment is invalid and discarded.

3) Compute the density of the valid vertical edge segments in a text candidate area.

4) Select only those candidate areas with high valid vertical edge density and discard the rest. Text areas should possess a high density of vertical edges produced by the strokes of the characters.

Moving texts sometimes occur in video sequences, as in the pretitle, credits, etc. They usually consist of long paragraphs describing the context/background of the story/event, or lists of people involved in producing the movie/video. They can move vertically, as in most pretitles, or horizontally, as in storm warning inserted in ongoing TV program. The duration of moving texts in a video sequence is usually much less than still texts, while they contain no less information about the content and the context of the video. In video skimming/abstraction where a small subset of the video sequence is extracted which covers the essential contents of the whole sequence, it is advantageous to estimate the velocity and direction of moving captions to determine how frequently to sample the video sequence to cover all the captions with a minimum number of frames. This is performed in the motion analysis mechanism 26. Furthermore, with the estimate of moving text, the detection results can be improved by removing the false positives which are inconsistent in time, and also making up missing text areas using the temporal coherence of text areas.

By using the vertical edges which are insensitive to intensity change and varying background, text areas can be better identified. They are the invariants in the video sequence, compensated for their motion. As is known from previous discussion, these aligned vertical edge segments correspond to the vertical part of the individual characters, corresponding texts can be matched by matching these vertical edge segments. A Hough Transform based approach can be used to perform the pattern matching. This Hough Transform based method has the advantages that it is robust to occlusion, which is typical for moving texts in the video because that new texts move in and old texts move out of the video sequence. The texts that appear in one frame may not appear in its neighboring frames. The Hough Transform based method also attempts to find the consistent movement voted by the majority of the individual patterns. As a result, it is insensitive to a small number of noisy edge segments caused by the background or image noises.

The computation is simple and fast when the parameter space is one dimensional, for example, if it is assumed that all texts in the sequence either move horizontally, or move vertically, or keep still, which is reasonable for typical video sequences. Under this assumption, vertical or horizontal displacements can be obtained by two passes of 1D search in the Hough transformed space.

The matching algorithm developed proceeds as follows:

Establish one-dimensional bins for the vertical displacements. Initialize the vote bins to zero. The bins are indexed from -maxdisp to maxdisp, where maxdisp>0 is the maximum displacement allowed; the displacements axe measured in pixels.

Compute the patterns in two consecutive I-frames which both contain texts. The patterns are computed as the centroids of the valid vertical edge segments in the detected text areas as previously computed.

The calculations are as follows:

1. Let the centroids of the ith valid vertical edge in the Ith frame be $(x_{1,i}, Y_{1,i})$, for every pattern $(x_{1,i}, y_{1,i})$ in I-frame l, do for every pattern $(x_{1+1,j}, y_{1+1,j})$ in I-frame l+1
2. if $x_{1+1,j}$ is within the neighborhood of $x_{1,i}$, i.e., x1,i−δ≤$x_{1+1,j}$ and $x_{1+1,j}$≤
3. $x_{1,i}$+δ, increase the bin for displacement $y_{1+1,j}-y_{1,j}$ by 1. δ is the radius of the neighborhood;
4. Find the bin with the maximum number of increases. The corresponding displacement gives the estimate in y dimension.
5. The displacement in the other dimension is computed in a similar manner.
6. Text extraction refinement based on temporal consistency
7. Once the velocity of moving text is obtained, the position of a text area can be predicted by the text location mechanism 28. The text area in a subsequent I-frame is determined given its position in the previous I-frame and the text displacement vector for these two frames. Assuming each text presents in more than two I-frames, and assuming texts are rigid to maintain their relative positions, the temporal information can be used to remove false positives and detect text areas that are missed based on single frame information. If a text candidate area is temporally isolated, i.e., it has no corresponding area in its neighboring frames after motion compensation, it is considered a false positive and removed. On the contrary, if a text area is detected in I-frame l−1, and there is a detected text area in I-frame l+1 which corresponds to it after the motion compensation, then the corresponding area in I-frame I (after motion compensation) is also declared as a text area, if not declared before.

In summary, the method 30 starts with the calculation of the horizontal text energy block 32 where the horizontal text energy is calculated for each DCT block by summing up the absolute value of the DCT coefficients. Then in the threshold decision block 34, a predetermined threshold of the horizontal text energy is applied to obtain blocks of high horizontal variation. These blocks are designated as potential text blocks.

The potential text blocks are then subject to the morphological operation in the remove noise and merge block 38 to remove isolated noisy blocks and merge disconnected text blocks. Next, the low vertical energy area decision block 40 verifies text areas using the heuristics that text lines also represent horizontal, gray-scale variations. If an area contains a row with high vertical energy, it is kept for further processing in the reconstruction of detected text areas block 44. The vertical edge components in these areas are calculated, and if the density of the horizontally aligned edges is greater than a predetermined threshold value, in the calculation of vertical edge components block 46 and the density threshold determination block 48. The area will be provided to the applied temporal adjustment block 50 where temporal adjustments are applied to consecutive frames which contain text. The displacement of text in two consecutive frames is established and candidate frames are eliminated where there are no corresponding areas in the frames before and after. The output is then outputted as located text in the block 60.

Once the text is placed into the OCR system 22, it can be further manipulated as shown in FIG. 3. The individual characters would be placed back in text format in the text mechanism 102, and then transferred to the understanding system 104 which could be an alphabetizer to establish an index, a key word organizer, or similar type systems so that the content output 108 could be provided as an index of the video or image content, the output of a search engine, or similar such systems.

Similarly, through the text mechanism 102, the text could be provided to a speech synthesis mechanism 112 which would provide such features as allowing blind people to hear foreign language films which have subtitles in a different language.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A text detection system for DCT compressed images comprising:
   a calculation mechanism for calculating variations of a first energy in said DCT compressed images whereby predetermined values of said first energy indicate possible text areas in said DCT compressed images;
   a threshold mechanism for screening for said predetermined values and outputting potential text areas;
   a detecting mechanism for detecting variations of a second energy in said potential text areas indicative of the possibility of text in said potential text areas and outputting detected text areas; and
   a reconstruction mechanism for decompressing said DCT compressed images detected text areas.

2. The text detection system as claimed in claim 1 wherein said calculation mechanism for calculating variations of said first energy calculates a horizontal text energy for each DCT compressed images area.

3. The text detection system as claimed in claim 2 wherein said threshold mechanism detects DCT compressed images areas below the predetermined horizontal text energy which is required for processing potential text areas to said detecting mechanism.

4. The text detection system as claimed in claim 1 wherein said potential text areas contain noise and are disconnected, and including a morphological mechanism for removing noisy areas and connecting disconnected text areas.

5. The text detection system as claimed in claim 1 wherein said detecting mechanism for detecting variations of said second energy detects vertical energy and outputs detected text areas having vertical energy over a predetermined value.

6. The text detection system as claimed in claim 1 wherein said reconstruction mechanism includes a calculation mechanism for calculating vertical edge components in said detected text areas.

7. The text detection system as claimed in claim 6 including:

second threshold means for screening probable text areas where the calculated vertical edge components provide a density of horizontally aligned edges greater than a predetermined threshold value.

8. The text detection system as claimed in claim 1 including:

temporal adjustment means mechanism to adjust consecutive frame images containing said detected text areas;

an estimation mechanism for estimating the displacement of text in two consecutive frame images of said detected text areas; and an elimination mechanism for eliminating said two consecutive frames where there are no corresponding detected text areas.

9. The text detection system as claimed in claim 8 including:

a third threshold mechanism for screening for frame images having corresponding text areas before and after a predetermined frame image.

10. The text detection system as claimed in claim 1 including:

an output for outputting said text from said detected text areas; and processing means for providing a text content from said output text.

11. The text detection system as claimed in claim 1 including:

an output for outputting said text from said detected text areas; and synthesizing means for providing speech output from said output text.

12. A method of text detection for DCT compressed images comprising the steps of:

calculating variations of a first energy in said DCT compressed images whereby predetermined values of said first energy indicate possible text areas in said DCT compressed images;

screening for said predetermined values and outputting potential text areas related thereto;

deleting variations of a second energy in said potential text areas indicative of the possibility of text in said potential text areas and outputting detected text areas; and decompressing said DCT compressed image detected text areas.

13. The method of text detection as claimed in claim 12 wherein said step of:

calculating variations of said first energy includes the step of calculating a horizontal text energy for each DCT compressed images area.

14. The method of text detection as claimed in claim 13 wherein said step:

of screening screens DCT compressed images areas below a predetermined horizontal text energy.

15. The method of text detection as claimed in claim 12 wherein said potential text areas contain noise and are disconnected, and including a morphological mechanism for removing noisy areas and connecting disconnected text areas.

16. The method of text detection as claimed in claim 12 wherein said step of:

screening includes screening for variations of said second energy as a vertical energy and outputting detected text areas having the vertical energy over a predetermined value.

17. The method of text detection as claimed in claim 12 wherein said step of:

decompressing said DCT compressed images detected text areas includes the step of calculating vertical edge components in said detected text areas.

18. The method of text detection as claimed in claim 17 including the step of:

screening probable text areas where the calculated vertical edge components provide a density of horizontally aligned edges greater than a predetermined threshold value.

19. The method of text detection as claimed in claim 12 including the steps of:

temporarily adjusting consecutive frame images containing said detected text areas;

estimating a displacement of text in two consecutive frame images of said detected text areas; and eliminating said two consecutive frames where there are no corresponding detected text areas.

20. The method of text detection as claimed in claim 19 including the step of:

screening for frame images having corresponding text areas before and after a predetermined frame image.

* * * * *